(12) United States Patent
Mrvaljevic et al.

(10) Patent No.: US 9,817,780 B2
(45) Date of Patent: Nov. 14, 2017

(54) COMMUNICATOR WITH PROFILES (71) Applicant: Fluke Corporation, Everett, WA (US)

(72) Inventors: Nikola Mrvaljevic, Mountlake Terrace, WA (US); Randy Peterson, Mukilteo, WA (US); Joseph V. Ferrante, Redmond, WA (US); Dileepa Prabhakar, Mill Creek, WA (US); David Clarence Dyck, Lake Forest Park, WA (US)

(73) Assignee: Fluke Corporation, Everett, WA (US)

( * ) Notice: Subject to any disclaimer, the term of this patent is extended or adjusted under 35 U.S.C. 154(b) by 379 days.

(21) Appl. No.: 14/539,856

(22) Filed: Nov. 12, 2014

(65) Prior Publication Data

US 2015/0134940 A1 May 14, 2015

Related U.S. Application Data (63) Continuation-in-part of application No. 14/535,231, filed on Nov. 6, 2014.

(60) Provisional application No. 61/962,325, filed on Nov. 13, 2013, provisional application No. 61/962,317, filed on Nov. 13, 2013.

(51) Int. Cl.
G06F 13/38 (2006.01)
(52) U.S. Cl.
CPC ............ G06F 13/38 (2013.01); G06F 13/385 (2013.01)
(58) Field of Classification Search
CPC .................................................... G05B 19/05
See application file for complete search history.

(56) References Cited

U.S. PATENT DOCUMENTS

| 5,764,891 A | 6/1998 | Warrior |
| 5,796,602 A | 8/1998 | Wellan et al. |
| 5,903,455 A | 5/1999 | Sharpe, Jr. et al. |
| 6,377,859 B1 | 4/2002 | Brown et al. |
| 6,976,366 B2 | 12/2005 | Starling et al. |
| 7,054,695 B2 | 5/2006 | Opheim et al. |
| 7,117,122 B2 | 10/2006 | Zielinski et al. |
| 8,200,783 B2 | 6/2012 | Eryurek et al. |
| 8,364,431 B2 | 1/2013 | Russell |
| 8,538,719 B2 | 9/2013 | Vetter et al. |

(Continued)

FOREIGN PATENT DOCUMENTS

| CN | 1348541 A | 5/2002 |
| CN | 101608927 A | 12/2009 |

(Continued)

OTHER PUBLICATIONS

International Search Report and Written Opinion mailed Feb. 6, 2015, issued in corresponding International Application No. PCT/US2014/064403, filed Nov. 6, 2014, 9 pages.

(Continued)

*Primary Examiner* — Albert Wang
(74) *Attorney, Agent, or Firm* — Seed IP Law Group LLP (57) ABSTRACT

A communicator has profiles for holding locators for items in a tree-like database for a smart device that monitors a process. The communicator is connected to the smart device and obtains tag and other identity information to find the profile for the smart device. When a profile is located, the communicator displays a list of configuration items and favorite items and loads the items on the list into the communicator as default inputs or settings.

11 Claims, 4 Drawing Sheets

(56) References Cited

U.S. PATENT DOCUMENTS

| | | | |
|---|---|---|---|
| 8,555,190 | B2 | 10/2013 | Ann et al. |
| 2002/0120375 | A1 | 8/2002 | Draoullec |
| 2004/0262387 | A1 | 12/2004 | Hart |
| 2005/0075968 | A1 | 4/2005 | Apostolides |
| 2006/0028225 | A1 | 2/2006 | von Appen |
| 2008/0294988 | A1 | 11/2008 | Nicholas |
| 2012/0004743 | A1* | 1/2012 | Anne .................... G05B 19/409 700/83 |
| 2012/0038458 | A1* | 2/2012 | Toepke ................ G05B 19/042 340/6.1 |
| 2012/0062577 | A1* | 3/2012 | Nixon ................ G05B 23/0272 345/522 |
| 2013/0138467 | A1 | 5/2013 | Small |

FOREIGN PATENT DOCUMENTS

| | | |
|---|---|---|
| CN | 102859452 A | 1/2013 |
| JP | 5-157592 A | 6/1993 |
| JP | 11-346162 A | 12/1999 |
| JP | 2008-004988 A | 1/2008 |
| JP | 2012-112866 A | 6/2012 |
| KR | 10-0620005 B1 | 9/2006 |
| KR | 10-2009-0070630 A | 7/2009 |
| KR | 10-0950434 B1 | 4/2010 |
| WO | 00/50848 A1 | 8/2000 |
| WO | 2013/117818 A1 | 8/2013 |

OTHER PUBLICATIONS

International Search Report and Written Opinion issued in corresponding International Application No. PCT/US2014/065286, filed Nov. 12, 2014, 7 pages.
Bowden, "HART Device Description Language: an example," retrieved from http://www.romilly.co.uk/ddexampl.htm on Apr. 7, 2017, 2 pages.
Emerson Process Management "475 Field Communicator," User's Manual, Rev H, May 2013, 134 pages.
Emerson Process Management "475 Field Communicator," User's Manual, Rev K, pp. 16-17, 27, 48, 50-53, 55-56, 66, 69, 71, May 2015, 15 pages.
Emerson Process Management, "Rosemount 3051S ERS Configuration Data Sheet," Configuration Data Sheet 00806-0100-4804, Rev AA, 2009, 00813-0100-4801, Rev JA, Apr. 2007, and 00806-0100-4801, Rev EA, Jul. 2013, 12 pages.
Emerson Process Management, "Rosemount 3051S Electronic Remote Sensors," Reference Manual 00809-0100-4804, Rev AA, Jan. 2011, 13pages.
Emerson Process Management, "Rosemount 644 Temperature Transmitter," Product Data Sheet 00813-0100-4728, Rev RA, Catalog 2011-2012, 22 Pages.
Extended European Search Report, dated Apr. 4, 2017, for European Application No. 14862884.5-1853 / 3069488, 13 pages.
Fluke Corporation, "Transmitter Calibration with the Fluke 750 Series Documenting Process Calibrator," Document No. 3792201B A-EN-N, 2011, 8 pages.
Fluke Networks, "753/754 Documenting Process Calibrator," Users Manual, Jul. 2011, 128 Pages.
Fluke Networks, "AirCheck Wi-Fi Tester," retrieved from http://www.flukenetworkd.com/enterprise-network/network-testing/AirCheck-Wi-Fi-Tester on Nov. 6, 2013, 8 pages.
Fluke Networks, AirCheck™ Wi-Fi Tester Getting Started Guide, PN 3434814 Rev.3, 3/12, Dec. 2009, 24 pages.
Fluke Networks, "HART® Transmitter Calibration," Document No. 1262439H A-EN-N, 2004, 16 pages.
Fluke Networks, "Innovative Solutions for Successful Wireless Network Management," Document No. 3996296B, 2012, 14 pages.
HART Communication Foundation, "Calibrating HART Transmitters," Document No. HCF_LIT-054, Revision 1.1, Nov. 2008, 14 pages.
Omega, "PX750 Pressure Transmitter User's Guide," Appendix, p. A-1, 1999, 3 pages.
Omega, "PX750 Pressure Transmitter User's Guide," Appendix, p. A-2, 1999, 3 Pages.
Pirret, "Maintenance and Calibration of HART Field Instrumentation," Fluke Corporation, 2010, 7 pages.
Supplementary European Search Report, dated May 29, 2017, for European Application No. 14861816.8-1853 / 3069351, 14 pages.
CN Application No. 201480062274.1, First Office Action dated Jul. 18, 2017, 6 pages.

* cited by examiner

FIG. 5

COMMUNICATOR WITH PROFILES

CROSS-REFERENCES TO RELATED APPLICATIONS

This application is a continuation-in-part of patent application Ser. No. 14/535,231, filed Nov. 6, 2014, and claims the benefit of Provisional Application No. 61/962,317, filed Nov. 13, 2013, and Provisional Application No. 61/962,325, filed Nov. 13, 2013, the disclosures of which are hereby incorporated by reference herein.

BACKGROUND

In process plants, field devices that sense or control parameters for processing chemicals and pharmaceuticals are smart devices. A smart device is a measurement and/or control module with a transmitter that can communicate with host devices over a wired or wireless communication channel using one or more standard protocols. "Transmitter" is often synonymous with smart device.

Host devices include computers, calibrators, communicators, tablets and personal digital assistants. Some standard protocols are HART, an acronym for Highway Addressable Remote Transducer, or FOUNDATION Fieldbus. HART is an industry standard for a hybrid protocol that enables communications between smart field devices and a control system that employs legacy 4-20 mA wiring. FOUNDATION Fieldbus is an all-digital protocol. Other protocols are PROFIBUS and PROFINET International.

A smart device with the HART protocol has a microprocessor and one or more memories. The memories hold data about the manufacturer of the device, its current readings for a primary variable, other variables, and ranges of one or more variables. The microprocessor is programmed to perform a number of specific operations and to respond to predetermined commands. Such commands include and are not limited to reading manufacturer information, reading a primary variable (e.g., pressure), and reading one or more secondary variables (e.g., temperature). Other commands are used to configure the smart device, including and not limited to setting the range of the measured variables, including their upper and lower range limits.

A smart device has one or more transducers that measure physical parameters, such as pressure or temperature or control whether a valve is open or closed and the percentage of how much the valve is open. Transducers convert a signal of a parameter in one form of energy (e.g., pressure, flow) into electrical signals. The output of the transducer is converted from analog to digital values by an analog-to-digital converter whose output is input to a microprocessor. Some smart devices may have a microprocessor and circuitry for performing A-to-D and A-to-D conversion in a single chip. Depending upon the type of communication network, the microprocessor output may be converted into an analog value for transmission via a wired or wireless transmitter.

A smart device stores many types of information in its memory. For example, a smart device also stores the units of the primary variable of the device, the lower range value, upper range value, damping, and transfer functions. Smart devices also store tag information to identify the device by its location in the process, its function, and information identifying the manufacture, model, and revision of the smart device. The tag information is in the memory of the smart device. The tag parameter/field is entered in the smart device by the end user. A host, such as a calibrator or communicator, uses universal commands to locate and read tag information.

In order to access information and settings in the smart device, such as primary, secondary, and other variables and parameters, each smart device is associated with a Device Description (DD). The DD describes the capabilities of a smart device. The DD is organized in a hierarchical structure (tree) of read-only parameters, read/write parameters, standard operating procedures (methods), and other information for use by a communication host. A DD has menus and graphic display features that are used by host applications (including handheld calibrators, communicators, and other hosts) to access all parameters and data in the corresponding smart device. A DD is typically written by the manufacturer of a smart device. The specifications for a DD are controlled by standards bodies such as IEC and ISA with contributions from HART Communication Foundation, Fieldbus Foundation, PROFIBUS and PROFINET International.

The DD is an electronic data file stored in a host device, such as a communicator. A DD comprises multiple levels and is arranged in the tree-like structure with branches between levels. A DD is similar to a database of information about the device, and includes algorithms for use when attempting to accomplish specific tasks with the device, such as sensor trim, and locations in the smart device where information is stored. DDs provide the information needed by a host such as a communicator, calibrator, host application, or control system to properly access device information and display device information located in smart devices.

A DD and its menu structure are unique to a device and a device revision. A DD for one device cannot be used with a completely different device from another manufacturer, even if that other device were to offer the same functionality. However, DDs do support multi-vendor interoperability. Each device may be configured to specific parameters so that process managers may configure transmitters from one manufacturer to replace a device from another manufacturer. The DD does not contain any information about current values in a smart device but enables a host to read the memory of the device and to acquire items of device information that are stored in the device transmitter.

The DD declares or explains a device such as a smart device transmitter. Actual processing is done by communication host devices such as communicators or calibrators. A communication host uses a DD to communicate with a smart device. A communication host is capable of communicating with smart devices using one or more protocols. A host has the ability to display various parametric values and allows the user to set configuration parameters on such transmitters. A host may use DDs that persist in the host's storage memory, in order to provide access to the full capabilities, as described by the provider of the DD, of that smart device.

A conventional communicator has a display, a numerical keypad, function buttons, and navigation buttons for moving from one menu to the next, through menus, and left or right and up and down in a given menu. In some embodiments, the communicator has input and output communication ports that are connected via cables or wirelessly to the smart device. When a communicator is connected to a smart device, the communicator uses a DD for the smart device to access parameters and other data stored in the memory of the smart device. The communicator has a DD interpreter file that is executable to allow the technician to navigate from the entry level to any location in the in the memory of the smart device.

Many smart devices have hundreds of different parameters. Using a DD, one may follow its intricate structure to reach any or all of the locations in the smart device that hold parameters. However, DDs are arranged in multiple-branched levels. Each level may hold one or more potential preferred parameters. In order to reach each location, one must begin at the start of the DD structure and follow its path to each parameter. When parameters are in different branches, one cannot jump from one parameter to another without navigating up the DD hierarchy.

Technicians perform inspections, maintenance, tests, and troubleshoot smart devices in the process plant. They access data from the smart devices with a handheld instrument such as a communicator. Communicators use DDs to inspect and configure smart devices. Configuration means using the communication protocol to change settings inside the smart device. Although a communicator can be used for configuration and checking diagnostic information, it cannot be used for calibration to check the measurement accuracy of a smart device. Configuring parameters of a HART transmitter with a communicator is not calibration and does not assure accuracy. For a true calibration, a reference standard is always needed.

Technicians who inspect smart devices often repeatedly inspect the same parameters for a given device and may configure those same parameters as needed. For each parameter to be inspected, the technician must start from the beginning of the DD structure and navigate through the smart device to the location of the desired parameter. As such, routine inspections are tedious and time-consuming.

Because the same parameters are often repeatedly inspected and configured, inspection and configuration are tedious, repetitive, and time consuming. There has been a long-felt need and unmet need for a communicator that rapidly accesses certain parameters, reads, records, and reconfigures the parameters without navigating along the intricate DD data structure.

SUMMARY

The following summary introduces a selection of concepts in a simplified form that are further described below in the Detailed Description. This summary is not intended to identify key features of the claimed subject matter, nor is it intended to be used as an aid in determining the scope of the claimed subject matter.

Disclosed herein are methods and systems that reduce the time required for making inspections and simplify maintenance procedures by providing a handheld instrument such as a communicator, that stores preferred parameters as a list of "favorite" parameters. In various embodiments, a handheld communicator has a controller with a processor and memory coupled to the processor. The memory holds an operating system program and one or more application programs. The application programs include one or more device description programs and a communications protocol program for reading the device descriptions obtained from smart devices. HART, FOUNDATION Fieldbus, PROFIBUS, and PROFINET International are examples of well-known and widely used protocols for enabling electronic communication with smart process devices.

In certain embodiments, an instrument, in particular a communicator, is configured to perform inspections and configurations on smart devices. The instrument is connected to the smart device via a set of electrical cables or via a wireless connection. In this regard, modern plants and equipment have wireless transceivers included in communicators and smart devices. As described earlier, the instrument holds device descriptions for a number of smart devices.

The instrument or communicator has a memory that holds one or more profiles. Each profile is a unique container associated with only one smart device and one smart device tag. In other embodiments, the profile may be associated with multiple smart devices and smart device tags. Each profile includes, among other items, the locators for a number of DD items, including favorites, and one or more sets of configuration values, including and not limited to a primary variable and other variables selected by a user. The processor operates the instrument or communicator to read one or more parameters stored in the smart device and to configure one or more of those parameters.

In some embodiments, the favorites include parameters such as one or more of the group comprising pressure, temperature, flow, and position. A technician can review the profiles stored in the instrument or communicator to see if there is an existing profile for the smart device. If there is no existing profile, the technician may create a new profile. If there is an existing profile, the instrument or communicator will load favorite parameters for inspection and configuration from the profile as default values for inspection and configuration operations.

Also disclosed herein are embodiments for methods and systems that reduce the time required for inspecting and configuring smart devices by providing an instrument or communicator that retains parameters as a list of favorite parameters. Some favorite parameters may be predetermined by the instrument or communicator manufacturer and others may be designated by the user of the instrument or communicator. In some embodiments, favorites may be entered at any time including and not limited to times when the instrument or communicator is online and connected to a smart device transmitter, or other times when the instrument or communicator is offline and disconnected from the transmitter.

DESCRIPTION OF THE DRAWINGS

The foregoing aspects and many of the attendant advantages of this embodiments will become more readily appreciated as the same become better understood by reference to the following detailed description, when taken in conjunction with the accompanying drawings, wherein.

DETAILED DESCRIPTION

The following definitions are adopted for certain terms used in this patent:

Profile: A profile is a container that includes a collection of configuration items and device information items associated with each smart device including a device tag, a bus protocol, manufacturer, and model. Each transmitter is unique and has a corresponding unique profile of favorites and configuration items.

Favorite: A favorite is a unique identifier for the location (hereinafter "locator") of information in the smart device memory that maps to a specific and unique item in the manufacturer-provided Device Descriptor (DD) tree.

Favorite Entry: A single entry in a list of favorites. Also used as a synonym for favorite. There are slot favorites and user favorites.

Slot Favorite: A slot favorite is one defined by a host manufacturer that informs the user, via a manufacturer-defined name, which specific DD item is mapped to that slot favorite. It includes a locator and maps to a specific and unique item in the manufacturer provided Device Descriptor (DD) tree. However, a slot is not restricted to that specific DD item. Slots may be the most commonly used DD items by end users for configuration or inspection. Slots are DD items that streamline configuration, by specifying the process variable, upper and lower limits, or the sensor trim method before configuration begins, and for use during the process of configuration. Slots reduce the need to prompt the user to navigate through the entire DD tree and select these items each time they perform the configuration of this smart device.

User Favorite: A user favorite is a free-form favorite that the user can designate for any DD item. User favorites do not have any host manufacturer-defined names (other than perhaps generic names like "User Favorite 1," "User Favorite 2," etc.) and the DD label itself may be used in the favorites list.

Configuration setup: This specifies the measurement mode, source mode, and upper test range, and lower test range, number of test points including their sequence and distribution, and transfer function, including square root mode and others. See the Background, above, for specific examples of configuration setup items.

DD Tree: The complete DD menu structure with its multiple levels and multiple branches.

DD Item: A DD item is any item, including menus and sub-menus, in the DD tree.

DD Tree View: This is commonly referred to as the communicator view. The entire DD tree can be navigated and used as intended by the DD writer, sometimes for a specific host type (handheld or a PC), in this view.

Favorites View: This is an alternative view. In this view, information (live and/or offline) of DD items from the DD tree that the user has added to the favorites list will be displayed. On each favorite entry, the user can perform actions similar to what he would have been able to perform from the DD tree on that DD item, such as reading or writing a value to the smart device. The favorites view is a flat list of slot favorites and user favorites.

Figure 1:
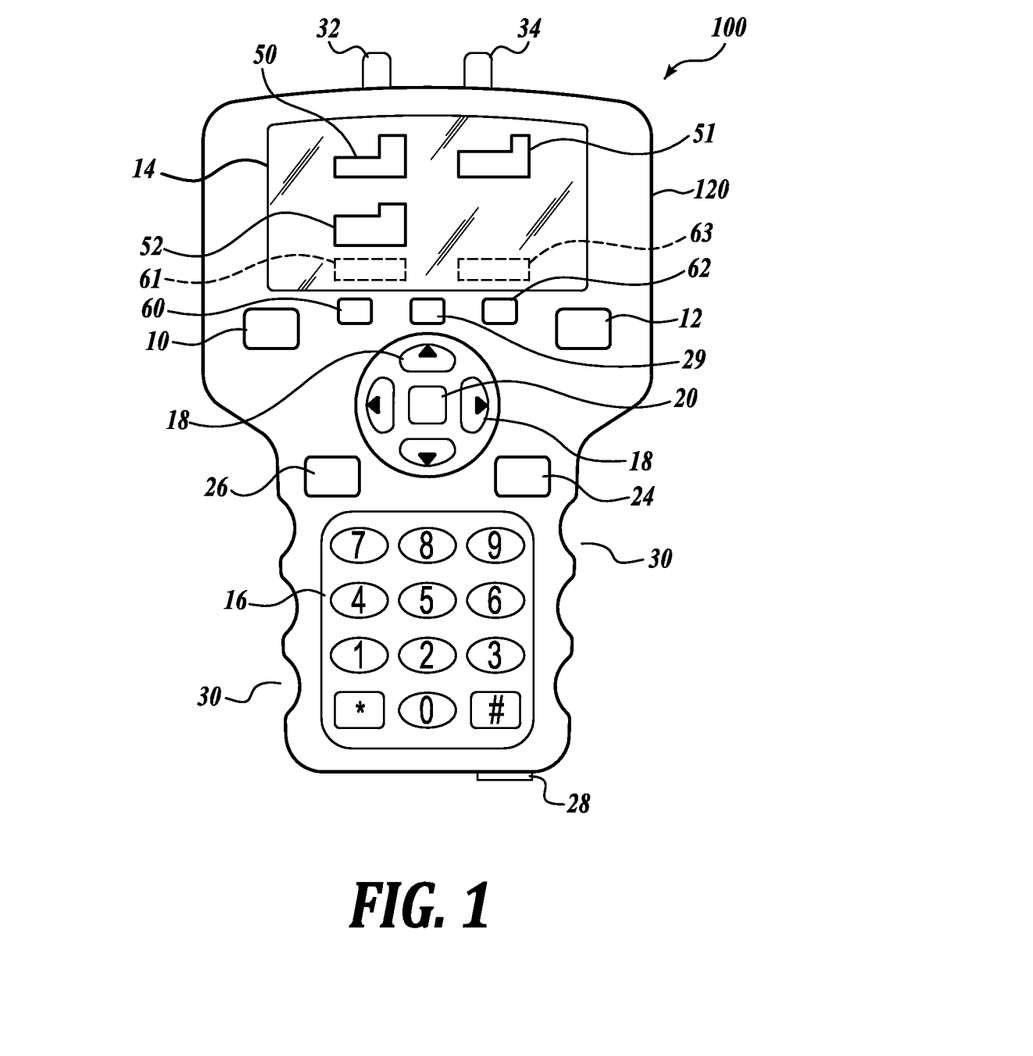
FIG. 1 is a plan view of a communicator.

Referring to FIG. 1, the components of one embodiment of an instrument, a communicator 100, will now be described in greater detail. The communicator 100 has body 120 with top and bottom cavities that hold circuitry, a battery, a wireless transceiver, and other mechanical and electrical elements required to place the communicator 100 in communication with smart device 150 (see FIGS. 2, 3). In some embodiments the lower portion of the body 120 has optional ridges 30 that enhance the grip of a technician on the body 120.

In one embodiment, the communicator 100 has components including I/O terminals 32, 34, a display 14, four navigation buttons 18 for moving a cursor within the display, and a selection button 20 for selecting an entry at the cursor location. Other components include a keypad 16, and a battery charger terminal 28. One button 10 turns the communicator 100 on and off. Another button 12 adjusts the backlight of the display 14 and indicator 29 shows the status of a wireless transmitter. Some embodiments may have a touch screen display. Still other embodiments may have optional hard keys 24, 26, and optional softkeys 60, 62 may be configured to control functions displayed in windows 61, 63 of the display 14.

Figure 2:
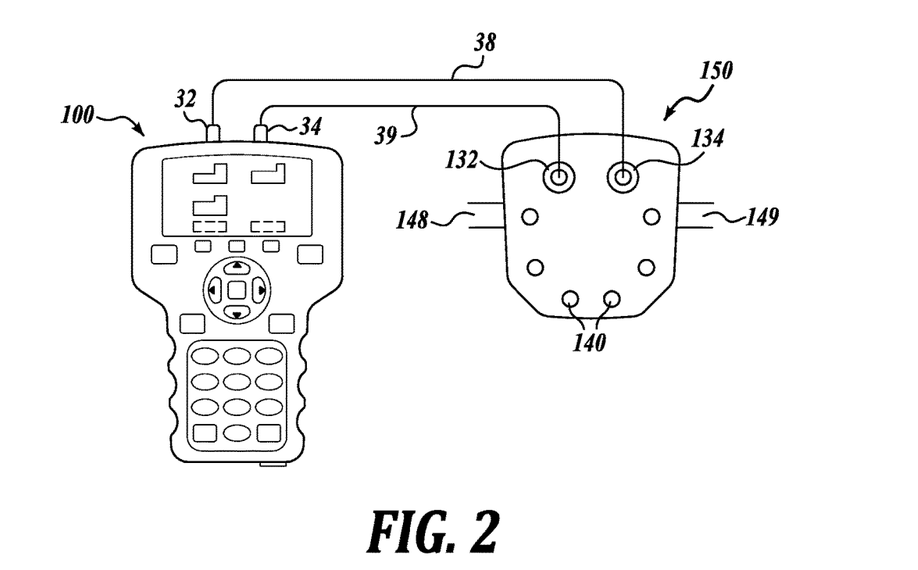
FIG. 2 is a schematic view of a communicator coupled to a smart process device.

Turning to FIG. 2, the communicator 100 is shown connected to a smart device 150. The smart device 150 has I/O terminals 132, 134 that are mechanically and electrically connected to terminals 32, 34 (see FIG. 1) of the communicator by conductors 38, 39. The smart device 150 has other electrical terminals 140 and mechanical ports 148, 149 for applying test inputs such as pressures and temperatures.

Figure 3:
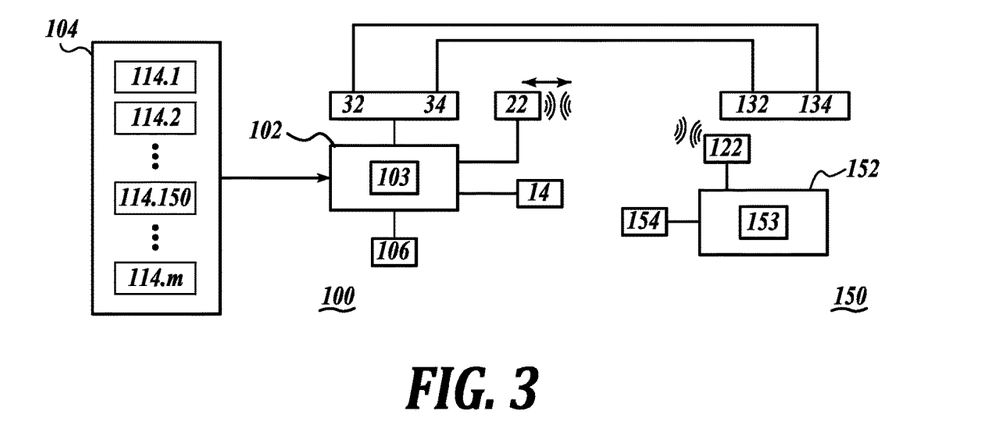
FIG. 3 is a schematic representation of a communicator coupled to the smart device.

Referring to FIG. 3, the communicator 100 has a controller 102, which includes a processor 103 for sending and receiving information via the I/O terminals 32, 34 or a wireless transceiver 22. Operator input device 106 represents the keypad 16, navigation buttons 18, and the optional select, function, and tab buttons 20, 24, 26 as defined by the manufacturer of the communicator. The communicator has a storage system 104.

Depending on the particular configuration and type of device, the storage system 104 may include system memory in the form of volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor 103. In this regard, the processor 103 serves as a computational center of the communicator 100 by supporting the execution of program instructions.

The storage system 104 may be any nonvolatile or a combination of nonvolatile and volatile, removable or non-removable memory, implemented using any technology capable of storing information. The information stored in the storage system 104 may include, but is not limited to, program modules and data to be accessed by the processor 103. Generally, program modules may include routines, applications, objects, components, data structures, etc., that perform particular tasks or implement particular abstract data types. It will be appreciated that system memory and storage memory described herein are merely examples of various computer-readable storage media.

The storage system 104 may also be configured to store information received from a smart device 150 through the I/O terminals 32, 34 or the wireless transceiver 22. When information is received in the storage system 104, the processor 103 may be configured to execute instructions to directly display the received information. The storage system is used to store the input commands entered on the input device 106 to pass through the DD of the smart device 150 to the preferred parameters. Storage system 104 has a favorites program 200 (shown in FIG. 5) that runs while the technician enters the commands made using the input device 106. Program 200 has one or more files to hold the commands associated with each preferred parameter. Storage system 104 may also store one or more protocols for reading device descriptions for one or more smart devices 150.

One or more profiles 114.1, 114.2 . . . 114.n are stored in the memory 104. Each profile is associated with a smart device through the use of device identification information, such as a device tag, and may be accessed by using that information. Each profile includes configuration information and favorite information. In particular, the memory 104 stores a DD 114.150 for the smart device 150. The DDs are tree-like databases having multiple menus, levels, and branches for holding parameters, configuration items, and other information to control the operation of the smart device 150.

The storage system 154 is configured to store device information including and not limited to the device tag, the type of device, manufacturer, model, its primary variable and primary variable analog output. As explained above, the smart device may hold hundreds of parameters in storage system 154. The processor 153 communicates with the communicator 100 using a suitable protocol to transmit requested parameter information or store received parameter information or to broadcast parameter information once configured to do so. Other stored information is information received from a communicator 100 through the I/O terminals 132, 134 or the wireless transceiver 122.

Other information stored in the storage system 154 may include, but is not limited to, program modules and data to be accessed by the processor 153. Generally, program modules may include routines, applications, objects, components, data structures, etc., that perform particular tasks or implement particular abstract data types. It will be appreciated that system memory and storage memory described herein are merely examples of various computer-readable storage media.

Depending on the particular configuration and type of device, the storage system 154 may include system memory in the form of volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor 153. In this regard, the processor 153 serves as a computational center of the smart device 150 by supporting the execution of program instructions.

The storage system 154 may be any volatile or nonvolatile, removable or non-removable memory, implemented using any technology capable of storing information.

The storage system 154 may also be configured to store information received by smart device 150 from communicator 100 via the I/O terminals 132, 134 or the wireless transceiver 122. If the smart device has a display, when information is received in the storage system 154, the processor 153 may be configured to execute instructions to directly display the information received from the operating and application programs.

Figure 4:
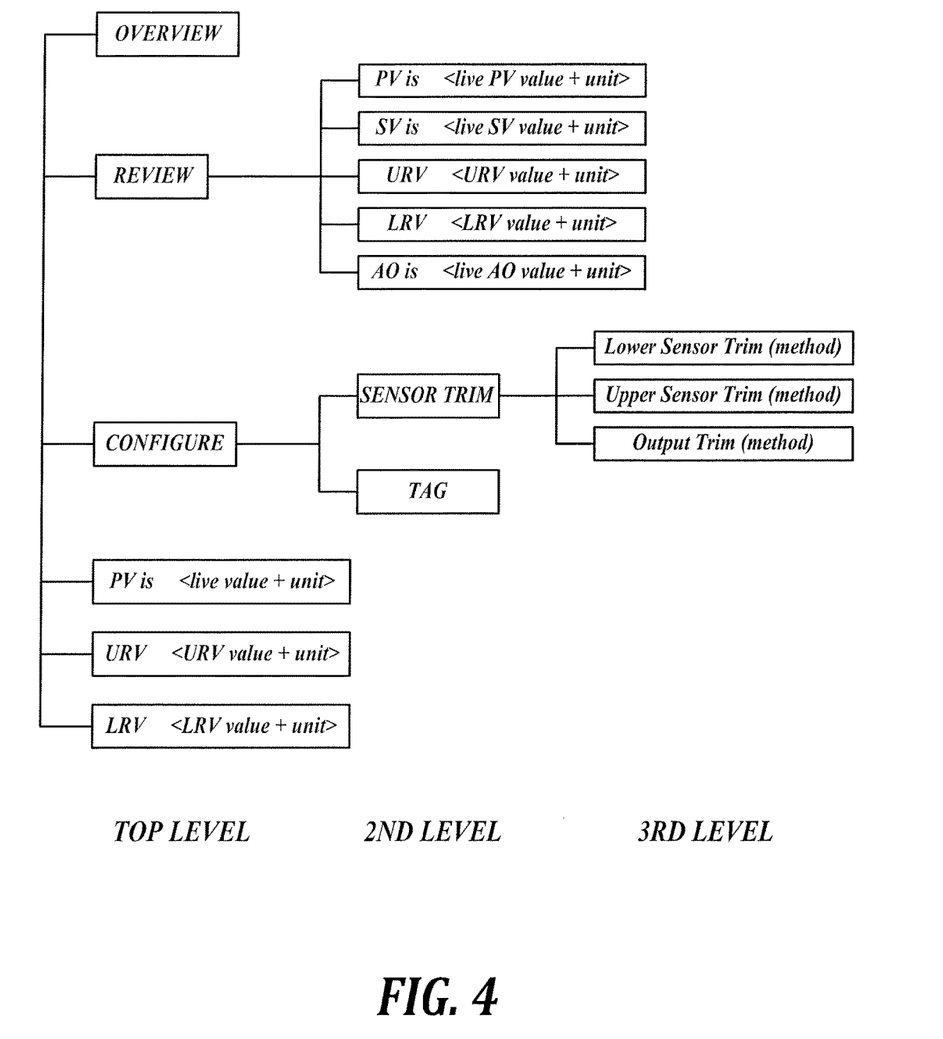
FIG. 4 is a simplified DD tree.

FIG. 4 includes examples of DD items in a DD tree that are used to conduct a typical DD-based inspection and configuration. Although a DD tree may hold hundreds of DD items, for purposes of explaining embodiments, FIG. 4 shows a simplified DD tree with only sixteen DD items. There are six first level items, including Overview, Review, Configure, PV (primary variable), URV (upper range value), and LRV (lower range value). There are seven second level items. The Review menu has five second level items, PV, SV (secondary variable), URV, LRV and AO (analog output). The Configure level has two second level items including, Sensor Trim and TAG. Sensor Trim has a third level with three items: (1) Lower Sensor Trim (method), (2) Upper Sensor Trim (method), and (3) Output Trim (method). An actual DD tree is more complex because any item in any level may be the basis for one or more subsequent levels each of which may contain one or more items. Although a DD tree is complex and tedious to navigate, it nevertheless provides a technician with at least one way to locate each of the hundreds of device variables of the smart device 150.

The profile-based communicator 100 streamlines the relatively slow manual inspection and configuration process described above. Instead of repeatedly finding and loading DD items into the communicator, a number of pre-determined configuration items and favorites are loaded as default inputs to the communicator 100.

The profile-based communicator 100 uses one or more of the locators of items in the one of the profiles 114.*n* associated with the selected smart device 150 as default input locators for inspecting and configuring smart device 150. The storage system 104 holds DDs profiles 114.*n* for a number of smart devices including, and not limited to, the smart transmitter device 150. In particular, the storage system holds a profile 114.150 for storing locators to favorite and configuration information associated with the smart device 150.

The profiles 114.*n* in the communicator 100 may be changed, any profile container may be copied, and any copy may be further modified or copied. Each profile container may be copied and sent to other communicators via the wired or wireless communications between two communicators. Another embodiment may use a personal computer to connect to a communicator and copy profiles from the communicator to the PC or to the communicator from the PC.

TABLE A shows examples of favorites, some of which act as one source of values for configuration items. The first column lists identifiers of a host manufacturer or user-defined identifiers for Favorites. Slot favorites are underlined and user favorites are in italics. In the second column, the mapped DD items are in bold. The third column shows the smart device value for a mapped DD item or a mapped DD item label.

TABLE A

| Favorite Identifier | DD Item Mapped | Smart Device Value/Method |
|---|---|---|
| Device tag | TAG under the Configure menu | Tag value |
| Primary Variable | PV in the top level | Live PV value + unit |
| Upper Range Value | URV in the top level | URV value + unit |
| Lower Range Value | LRV under the Review menu | LRV value + unit |
| Secondary Variable | SV under the Review menu | live SV + unit |
| Calibration Trim | Sensor Trim under the Configure menu | Sensor Trim (method) |
| *User favorite 1* | AO under the Review menu | Live AO value + unit |
| *User favorite 1* | Output trim under the Configure/Sensor Trim menus | Output trim (method) under Configure/Sensor Trim |

The embodiments disclosed herein streamline inspection and configuration processes by allowing the technician to automatically inspect and configure a smart device using the configuration and favorites of the profile as default inputs for the inspection and configuration processes. Predetermined commonly used configuration information for each smart device is stored in the profile for the communicator 100. The vendor or user provides the configuration information that is stored in the profile and the favorite information are loaded as default inputs to the communicator 100. As an alternative, the technician may manually change one or more of the default inputs.

The display 14 displays one or more menus 50-52. In operation, the communicator 100 may initially display only a main menu and allow the user to select one or more other menus. For purposes of illustration, menu 50 has an entry that allows a technician to invoke the favorites program 200 that has files that hold the commands for accessing locations of the favorite parameters in smart device 150 to read and/or configure each parameter of the smart device 150 without reentering the commands on the input device 106.

Figure 5:
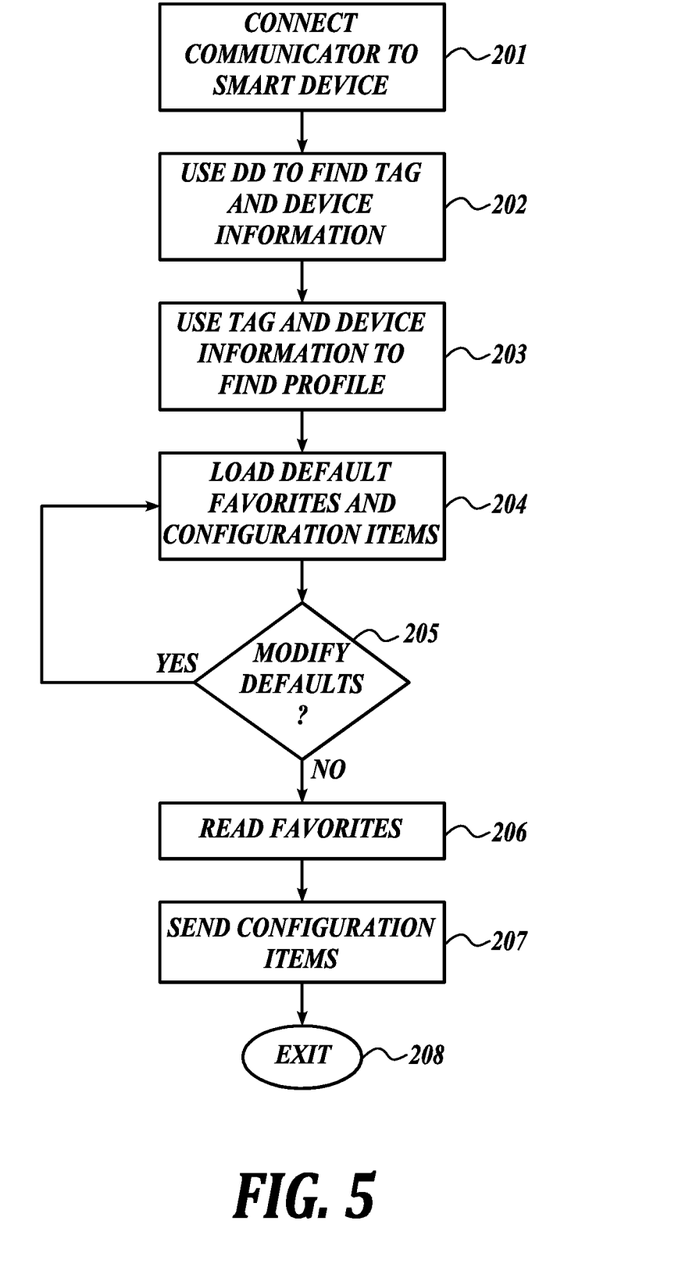
FIG. 5 is a flow chart of a method for configuring a smart device.

In operation, a technician operates communicator 100 to follow the steps shown in FIG. 5. In step 201, the technician couples a communicator 100 to a smart device 150 via communication wires or a wireless communication channel. In step 202, the technician operates a suitable protocol of the communicator 100 to enter universal commands or otherwise select menu entries that will drive the communicator to issue commands in the chosen protocol to request TAG and other device information. The TAG and device information provides the technician important information. It shows the primary variable measured by the smart device 150 and the units of measurement, e.g., pressure at pounds per square inch. It also shows the manufacturer, model and revision. In step 203, the communicator searches the memory 104 to find the profile 114.150 for smart device 150.

In step 204, the communicator loads the favorite items and configuration items as default inputs to the communicator 100 and displays the favorite items and configuration items in a view on display 14. While there are eight profile items in TABLE A, the display 14 may be large enough to only show four of the eight items. The technician may review each profile item by scrolling up or down the displayed view using the arrow buttons 18. In step 205 the technician may modify the defaults. This step includes adding or changing slot favorites and/or user selected configuration items. If there are no favorites or configuration items, the technician may create one or more favorites and configuration items as explained below.

The technician is now ready to perform a streamlined communication. In step 206, the technician; selects one of the favorites for reading information stored in the smart device at a location corresponding to the locator in the profile. The stored information may include, for example, the current live value of a primary variable, reading the upper range value of the primary variable, or reading the lower range value of the primary variable. In step 207, the technician sends one or more configuration items to the smart device for storage in a location corresponding to the locator in the profile for the configuration item. In a final step 208, the technician exits the program.

Technicians can perform a calibration operation with a standalone communicator and a standalone documenting process calibrator.

In alternate embodiments, there may be no predetermined manufacturer favorites and/or no user favorites. In those embodiments, at step 205 the user navigates via the DD tree to one or more items in the DD tree of the smart device and saves the location of the items as a favorite item locator or a configuration item locator in the profile for the smart device.

The profile-based communicator 100 and its methods have advantages compared to non-profile communicators. For the simple sixteen-item DD shown in FIG. 4, the technician using the profile-based communicator 100 was required to access the DD tree only once to configure device 150 and see favorites unique to the smart device 150. In contrast, a technician using a DD-only based communicator would not only use the DD to acquire the TAG and device identify, but also would have to use the DD tree to acquire the PV, URV, LRV, and configuration setup items prior to conducting a standard configuration. Using the DD tree to access information from the smart device 150 is tedious and time-consuming. In contrast, the profile-based communicator 100 automatically loads a set of commonly required DD items for taking usual configuration. With the profile-based communicator 100, the technician only occasionally may have to access the DD for non-profile information. Another advantage of the profile-based communicator 100 is the ability for the technician to manually change the profile and configuration values without having to access the full DD tree. Having accessed the locators for the DD items with the profiles, the technician may use the profiles to change any of the corresponding values stored in the smart device 150.

Each DD item locator for a Favorite is selected by the device vendor, communicator vendor or the user. The favorite may be many hierarchies deep, but each favorite holds a locator for the unique identifier in the DD. The profile stores the locators, not the live value that is read from the device. At any time the communicator is connected to the device, a user may view favorites in a flat list as an alternate view to the DD tree view. The flat list view will provide the user access to the same information that the DD provides, but only for the items that the vendor or user has added to favorites. In an alternative embodiment, favorites may be viewed in a list that may be a hierarchical list with a hierarchy that is different than that provided by the DD tree view.

A technician may use the profiles to inspect instantaneous values of the favorites. Using a communicator 100 equipped with profiles of smart devices, the technician visits a number of smart devices during an inspection or maintenance tour of a process plant. At a location of a typical smart device 150, the technician couples the communicator 100 to the smart device 150 using cables 38, 39 and input jacks 32, 34 of the communicator 100 and terminals 132, 134 of the smart device 150, or by operating the wireless transceivers 22, 122. As disclosed above, the profile 114.150 for device 150 includes one or more favorite parameters. After the communicator 100 identifies the profile 114.150 for the device 150, the technician may operate the communicator 100 to display the list of favorite parameters and record the current value live value of the favorite.

While preferred embodiments have been shown and described, modifications and variations may be made thereto by those of ordinary skill in the art without departing from the spirit and scope of the appended claims. In addition, it should be understood that aspects of the various embodiments may be interchanged either in whole or in part. Furthermore, those of ordinary skill in the art will appreciate that the foregoing description is by way of example only, and is not intended to limit the embodiments, except as further described in the appended claims. Those skilled in the art will understand that other and equivalent components and steps may be used to achieve substantially the same results in substantially the same way as described and claimed.

The invention claimed is:

1. A method of configuring a smart device, comprising:
providing one or more profile containers in an instrument, each profile container comprising locators for preselected items, said preselected items including configuration items and favorite items associated with the smart device, said favorite items including slot favorites and users favorites, wherein a slot favorite is defined by a host manufacturer or vendor of the smart device and, via a defined name, informs a user of the specific preselected item that is mapped to the slot favorite, and wherein the user favorites are free-form favorites that the user can designate for any preselected item;

operating the instrument to access one or more selected items in the smart device to acquire the identity of the smart device;

associating at least one of the profile containers in the instrument with the identified smart device;

displaying, on the instrument, a list of favorite items and configuration items using said locators from the associated profile container; and communicating, by the instrument, with the smart device, to exchange information between the instrument and the smart device at a location in the smart device corresponding to at least one of the locators on the list of favorite items and configuration items.

2. The method of claim 1, further comprising displaying on the instrument a flat list of at least one of said configuration items and favorite items.

3. The method of claim 1, further comprising the step of reading and saving information from at least one location in the smart device corresponding to a locator for a favorite item.

4. The method of claim 1, further comprising sending at least one configuration item from the instrument to the smart device for storage in a location corresponding to the locator for the configuration item.

5. The method of claim 1, wherein the profile container includes both configuration items and favorite items.

6. The method of claim 1, wherein the list of favorite items and configuration items comprises a first set of slot locations corresponding to one or more predetermined but configurable items and a second set of locations items enabled for configuration.

7. The method of claim 1, wherein the favorite items include at least one of pressure, temperature, flow, position, tank level, resistance, voltage and current.

8. An instrument for communicating with a smart device, wherein the smart device has a memory storing multiple items including items for configuring the smart device, the instrument comprising:

a processor for reading and executing programs;
a memory for holding programs and data;
a display for showing menus, lists and data;
a plurality of profile containers in the memory, wherein each profile container is associated with a different smart device and each profile container comprises locators for preselected items, said locators corresponding to favorite items and configuration items; and
a program operable by the processor for displaying in a list on the display at least one of the configuration items and favorite items from a profile container associate with the smart device and for loading one or more of the configuration items and favorite items as default inputs to the instrument, said favorite items in the list including slot favorites and users favorites, wherein a slot favorite is defined by a host manufacturer or vendor of the smart device and, via a defined name, informs a user of the specific preselected item that is mapped to the slot favorite, and wherein a user favorite is a free-form favorites that the user can designate for any preselected item.

9. The instrument of claim 8, wherein the list comprises a first set of slot locations corresponding to one or more predetermined parameters and a second set of locations defined by a user for storing locations of other parameters selected by the user.

10. The instrument of claim 9, wherein the predetermined parameters are at least one of pressure, temperature, flow, tank level, position, resistance, voltage, and current.

11. The instrument of claim 8, wherein the configuration items include one or more of the group comprising:
    (a) a zero limit;
    (b) an upper limit;
    (c) zero or one or more values between the zero limit and upper limit; and
    (d) a delay time.

* * * * *